United States Patent
Pecorari

(10) Patent No.: US 10,121,466 B2
(45) Date of Patent: Nov. 6, 2018

(54) METHODS FOR TRAINING A SPEECH RECOGNITION SYSTEM

(71) Applicant: Hand Held Products, Inc., Fort Mill, SC (US)

(72) Inventor: John Pecorari, Harrison City, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/619,093

(22) Filed: Feb. 11, 2015

(65) Prior Publication Data

US 2016/0232891 A1 Aug. 11, 2016

(51) Int. Cl.
*G10L 15/00* (2013.01)
*G10L 15/06* (2013.01)
(Continued)

(52) U.S. Cl.
CPC .......... *G10L 15/063* (2013.01); *G10L 15/075* (2013.01); *G10L 15/02* (2013.01);
(Continued)

(58) Field of Classification Search
CPC ....... G10L 15/22; G10L 15/30; G10L 15/265; G10L 15/063; G10L 15/065; G10L 15/02
(Continued)

(56) References Cited

U.S. PATENT DOCUMENTS

| 4,972,485 A | 11/1990 | Dautrich et al. |
| 4,994,983 A * | 2/1991 | Landell ................. G10L 15/063 704/245 |

(Continued)

FOREIGN PATENT DOCUMENTS

| EP | 1079370 A2 | 2/2001 |
| WO | 2013163789 A1 | 11/2013 |

(Continued)

OTHER PUBLICATIONS

U.S. Appl. No. 14/519,179 for Dimensioning System With Multipath Interference Mitigation filed Oct. 21, 2014 (Thuries et al.); 30 pages.

(Continued)

*Primary Examiner* — Vu B Hang
(74) *Attorney, Agent, or Firm* — Additon, Higgins & Pendleton, P.A.

(57) ABSTRACT

Speech recognition systems that use voice templates may create (or update) voice templates for a particular user by training (or re-training). If a training results in a vocabulary with similar voice templates, then the speech recognition system's performance may suffer. The present invention provides embraces methods for training a speech recognition system to prevent voice template similarity. In these methods, a trained word's voice template may be evaluated for similarity to other vocabulary templates prior to enrolling the voice template into the vocabulary. If template similarity is found, then a user may be prompted to retrain the system using an alternate word. Alternatively, the user may be prompted to retrain the system with the word spoken more clearly. This dynamic enrollment training analysis insures that all templates in the vocabulary are distinct.

20 Claims, 3 Drawing Sheets

(51) Int. Cl.
*G10L 15/07* (2013.01)
*G10L 15/02* (2006.01)
*G10L 15/065* (2013.01)

(52) U.S. Cl.
CPC .... *G10L 15/065* (2013.01); *G10L 2015/0636* (2013.01); *G10L 2015/0638* (2013.01)

(58) Field of Classification Search
USPC .......................................... 704/231, 244, 243
See application file for complete search history.

(56) References Cited

U.S. PATENT DOCUMENTS

| | | | |
|---|---|---|---|
| 6,535,850 B1 * | 3/2003 | Bayya | ................... G10L 15/07 704/239 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Bremer et al. | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |

(56) References Cited

U.S. PATENT DOCUMENTS

| | | |
|---|---|---|
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2006/0116877 A1* | 6/2006 | Pickering ............... G10L 15/08 704/231 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0090921 A1* | 4/2013 | Liu ......................... G10L 15/22 704/10 |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0262117 A1* | 10/2013 | Heckmann .......... G10L 15/1807 704/255 |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |

(56) References Cited

U.S. PATENT DOCUMENTS

| | | |
|---|---|---|
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/264,173 for Autofocus Lens System for Indicia Readers filed Apr. 29, 2014, (Ackley et al.); 39 pages.

U.S. Appl. No. . 14/453,019 for Dimensioning System With Guided Alignment, filed Aug. 6, 2014 (Li et al.); 31 pages.

U.S. Appl. No. 14/452,697 for Interactive Indicia Reader , filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Directing an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 14/340,627 for an Axially Reinforced Flexible Scan Element, filed Jul. 25, 2014 (Reublinger et al.); 41 pages.

U.S. Appl. No. 14/676,327 for Device Management Proxy for Secure Devices filed Apr. 1, 2015 (Yeakley et al.); 50 pages.

(56) References Cited

OTHER PUBLICATIONS

U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
European Search Report in related EP Application No. 16154356, dated Mar. 30, 2016, 6 pages.

* cited by examiner

METHODS FOR TRAINING A SPEECH RECOGNITION SYSTEM

FIELD OF THE INVENTION

The present invention relates to voice-directed workflow and, more specifically, to a speech recognition system with voice templates that are helped made distinct by a dynamic training analysis.

BACKGROUND

Voice-directed workflow systems allow workers to communicate verbally with a computer system. These systems may be used in warehouses or distribution centers to improve safety and efficiency for tasks such as picking, receiving, replenishing, and/or shipping.

Voice-directed workflow systems typically require a worker to wear a headset equipped with a microphone and earphone. Voice commands are transmitted to the worker via the earphone and spoken responses from the worker are received by the microphone. In this way, a worker may be directed to perform a task and respond with their progress by speaking established responses into the microphone at certain points in an established workflow dialog.

Speech recognition is part of a voice-directed workflow system. Speech recognition is the translation of spoken words into text/data via a computing device. A computing device configured for speech recognition is known as a speech recognizer.

Speech recognition is a challenging problem for a variety of reasons. First, the speech recognizer must detect speech versus background noise. For example, the speech recognizer must recognize that a sound represents speech rather than a breath. Next, the speech recognizer must compare the speech input to words and/or phrases in a vocabulary typically specific to the application (i.e., application vocabulary). Here, the speech recognizer may use the workflow dialog to help determine what was said.

Often, for a particular workflow dialog, the expected responses are limited to a range of possible responses, or even a single expected response. For example, if a worker is given a picking task with the prompt, "pick two," and the worker is expected to confirm the picking task with the response "two," then the speech that occurs after the prompt may be expected to match a voice template for "two." In general, a workflow has an associated application vocabulary consisting of voice templates for the vocabulary words, sounds, or phrases necessary to carry out the tasks associated with workflow.

Voice templates (i.e., speech templates or templates) are voice patterns for particular words or phrases stored in memory. The voice templates may be specific to a user in speaker-dependent recognition systems. Alternatively, the voice templates may be for all users (i.e., generic) in speaker-independent recognition systems. In either case, the speech recognizer determines how closely the received speech matches a stored voice template to determine what was most likely spoken.

Since everyone's speech may be different, custom voice templates may be created. To create a custom voice template for a word, a user may be prompted (e.g., through a display) to provide speech samples (e.g., by repeatedly saying a word). It is common to require workers new to a voice-directed workflow system to train the system for their voice by creating voice templates for a variety of words and/or sounds.

A problem arises when the voice templates created by a worker are not distinct enough for a speech recognizer to distinguish it from other words in the application vocabulary. For example, some workers may pronounce the word, "five," and the word, "nine," similarly. This may result in voice templates created for the word, "five," that are very similar to the voice template, "nine."

Voice template similarity may erode the speech recognizer's performance. For example, a worker may be asked to repeat what they have said which may reduce productivity and cause frustration. Errors may also occur as numbers may be transposed (e.g., a 5 recorded when a 9 was intended, or vice-versa).

Therefore, a need exists for analysis during the creation of a voice template (i.e., during training) to insure that a created voice template is not similar to (or does not match with) any other stored voice templates. If a similarity is found, then a user may be prompted to create a new, more distinct, voice template for the word. This dynamic training analysis may improve user experience and accuracy for voice-directed workflow systems.

SUMMARY

Accordingly, in one aspect, the present invention embraces a method for creating a voice template for a speech recognition system. The method begins with acquiring multiple samples of a spoken word from a user using the speech recognition system. Here, the spoken word represents a vocabulary word from an application vocabulary stored in a computer-readable memory (i.e., memory). Next, a voice template for the spoken word is created from the multiple samples. This voice template is compared to other voice templates for other words from the application vocabulary, and if the custom voice template for the spoken word is similar to at least one of the other voice templates for the other words, then the user is prompted to create a new voice template for the spoken word. The user is then provided with instructions for adjusting the spoken word to make the new voice template for the spoken word less similar to the other voice templates for the other words.

In some exemplary embodiments, the other voice templates for other words are custom voice templates created for a specific user, while in other embodiments the other voice templates for other words are generic voice templates created for any user.

In still other exemplary embodiments, the instructions for adjusting the spoken word may include prompts to help a user enunciate the spoken word more distinctly, while in others, the user may be prompted (e.g., by information displayed on a screen) to utter an alternative word to represent the spoken word. In some cases, the alternative word may be a particular alternative word present to the user, while in others the user may be presented with a set of possible words from which to choose the alternative word.

In another aspect, the present invention embraces a method for training a speaker-independent speech recognition system. The method begins by acquiring a speech sample of a word from an application vocabulary using the speaker-independent speech recognition system. This speech sample is compared to generic voice templates in the application vocabulary, and if the speech sample matches more than one of the generic voice templates, then the user is prompted to create a custom voice template for a substitute word. The speaker-independent speech recognition system is then trained on the substitute word. The resulting custom voice template for the substitute word is then stored in the application vocabulary, replacing the generic voice template for the word. If, on the other hand, the comparison of the speech sample to the generic voice templates in the application vocabulary does not find a match to more than one generic voice templates then no training is required and the speaker-independent speech recognition system used the generic voice template for the word.

In an exemplary embodiment of the method for training a speaker-independent speech recognition system, the prompts for a user to create a custom voice template for a substitute word includes a list of possible substitute words.

In some exemplary embodiments of the method for training a speaker-independent speech recognition system, the generic voice templates include voice templates for other words that sound similar to the word, while others the generic voice templates include voice templates for other words from the same class of words.

In some exemplary embodiments of the method for training a speaker-independent speech recognition system, the substitute word includes a different enunciation of the word, while in others the substitute word includes a new word chosen by a user that is different from the word.

In another aspect, the present invention embraces a method for re-training a speech recognition system. The method begins with acquiring a speech sample of a word using the speech recognition system. This speech sample is then compared to voice templates of word from an application vocabulary. If the speech sample matches more than one of the voice templates of the words form the application vocabulary, then the user is prompted to re-train the speech recognition system using an alternate word in place of the word.

In an exemplary embodiment of the method for re-training a speech recognition system, it is first determined that the speech recognition system has poor performance before acquiring the speech sample of a word.

In another exemplary embodiment of the method for re-training a speech recognition system, the voice templates include voice templates for words that sound similar to the word.

In another exemplary embodiment of the method for re-training a speech recognition system, the speech sample includes utterances of phrases that use the word.

In some exemplary embodiments of the method for re-training a speech recognition system, the alternate word includes a word chosen from a list of suggested words, while in other embodiments the alternate word includes a set of words.

The foregoing illustrative summary, as well as other exemplary objectives and/or advantages of the invention, and the manner in which the same are accomplished, are further explained within the following detailed description and its accompanying drawings.

DETAILED DESCRIPTION

Voice-directed workflow systems (e.g., used in warehouses or distribution centers) may benefit from speech recognition. Speech recognition systems help workers perform tasks (e.g., picking or restocking) without the need for paper or displays. As a result, the worker's hands and eyes are free to perform a task.

In these systems, each worker uses a speech recognition system communicatively connected to a host computer running software that supervises the workflow. A task prompt for a worker may be created by the host computer and then sent wirelessly to a speech recognition system worn by a worker. The speech recognition system may then convert the text/data task prompt into speech (e.g., using a speech synthesizer) and relay the spoken task prompt to the worker via a speaker (e.g., an earphone). The worker's spoken responses may be collected via a microphone, recognized as speech, converted into data/text, and then transmitted back to the host computer wirelessly.

Figure 1:
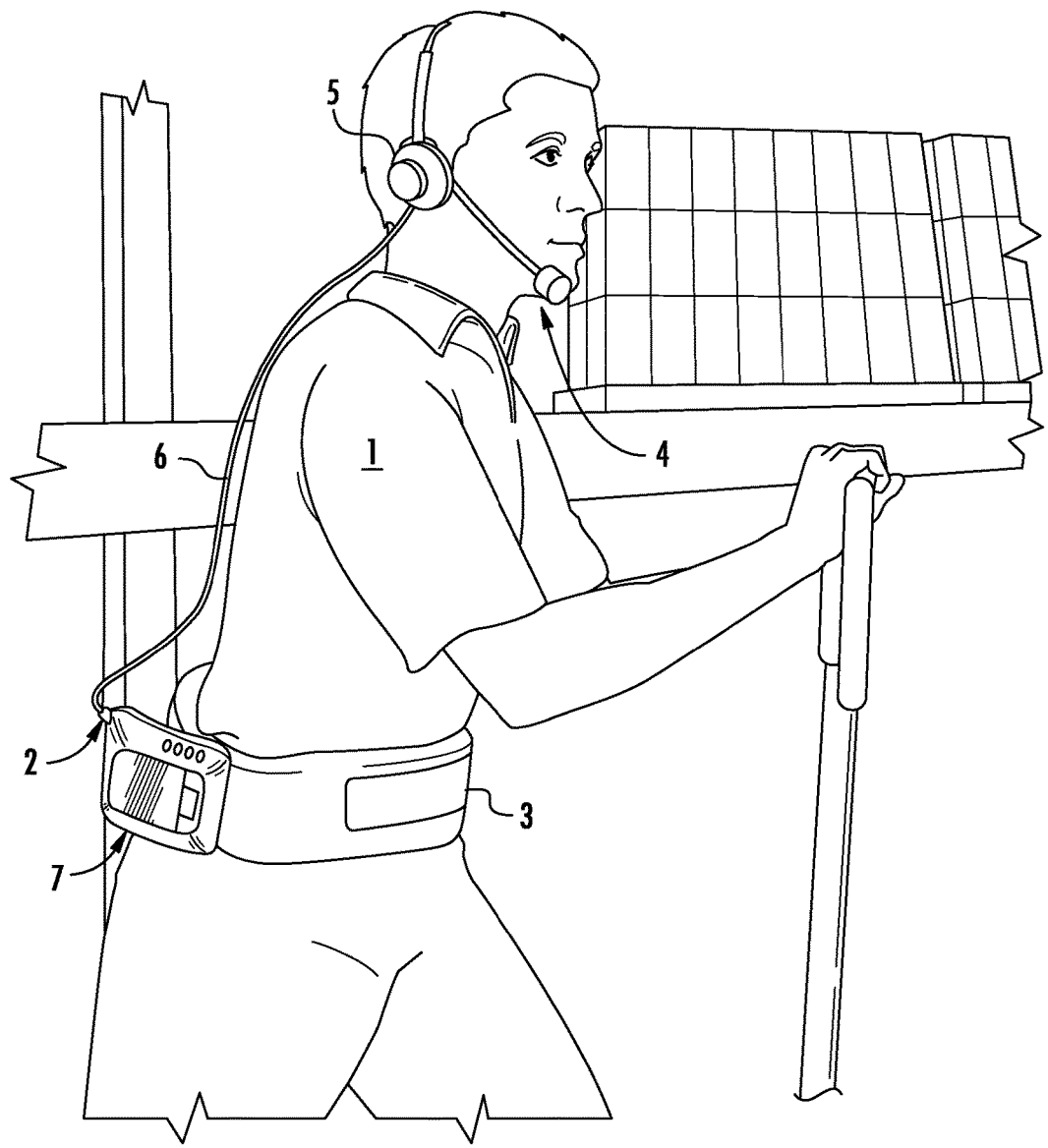
FIG. 1 illustrates a perspective view of a worker using a speech recognizer in a typical work environment according to an embodiment of the present invention.

FIG. 1 illustrates a perspective view of a worker using an exemplary speech recognition system. The speech recognition system has an audio input/output (I/O) device for receiving/transmitting audio. The audio I/O device shown in FIG. 1 is a headset worn by a worker 1. The headset is configured with an earphone 5 for transmitting sounds and speech to the worker 1 and a microphone 4 for receiving voice input from the worker 1.

The audio I/O device is communicatively coupled to a computing device 7. In some possible embodiments, the audio I/O device is integrated with the computing device 7 into a headset. In others, like the embodiment shown in FIG. 1, the computing device 7 is worn on a worker's body (e.g., via a belt 3). In some embodiments, the computing device may be wirelessly connected (e.g., BLUETOOTH™, near-field communication, etc.) to the headset, while in others the computing device may be connected via a cable 6.

The computing device 7 may be a single-purpose device, multipurpose device (e.g., barcode scanner), or may be a general purposed device like a smartphone. The computing device 7 may include variety of means for input/output (e.g., a display, buttons, touchscreen, etc.) and may have connectors 2 that enable peripheral input/output devices to be attached either temporarily or permanently.

The computing device 7 typically has some means of storage or memory (e.g., RAM, ROM, CD, DVD, hard-drive, solid state drive, etc.). Software programs and data may be stored in the memory and accessed by a processor (e.g., one or more controllers, digital signal processor (DSP), application specific integrated circuit (ASIC), programmable gate array (PGA), and/or programmable logic controller (PLC)).

The software programs stored in the memory and accessed by the processor may enable the speech recognition system to convert a digitally sampled voice waveform signal into text/data that represent the speech's intended meaning.

To accomplish speech recognition, the speech recognizer must first detect that something was spoken rather than some other sound (e.g., breath, wind, background noise, etc.). Next, the waveforms for the spoken words/phrase may be compared to a selected set of voice templates. The selected set of voice templates may be voice templates for expected words/phrase determined by the workflow dialog. For example, the response to a yes/no question is expected to be "yes" or "no." The speech recognizer determines which word/phrase from the selected set best matches what was spoken. For example, a similarity score may be computed between the spoken word and a voice template. If this similarity score is above a threshold then the spoken word may be considered an acceptable match to the voice template.

A voice template is representative voice waveform for a particular word. An application vocabulary is a collection of voice templates representing the words in the vocabulary. These voice templates may be unique to each user (i.e., custom) or may be generic for all users. Creating a custom voice template requires training.

Training allows each worker to create custom voice templates for the words in the application vocabulary. For example, a new worker may be required to train a speech recognition system before use (i.e., enrollment training). During a training session, a word or phrase may be presented to a worker via a display (e.g., on a display temporarily attached to the computing device 7). The worker may read the word aloud several times into the microphone 4. A program running on the computing device 7 may receive the speech signals and compute a statistical average of the word to form a voice template. The voice template may then be stored in the memory as part of the application vocabulary.

Custom voice templates are used in speaker-dependent speech recognition systems, while generic voice templates are used in speaker-independent speech recognition systems. Some speech recognition systems, however, may have both generic and custom voice templates to improve accuracy for a particular user on words that may sound alike.

Re-training (i.e., update training) a voice recognition system is sometimes necessary. In some cases, a speech recognition system will have poor performance on a particular word. For example, a user may notice that the system often requires the user to repeat the word, or a user may notice that the system falsely recognizes one word as another. Here, the worker may initiate re-training in order to create a new voice template for the word. In some embodiments, the detection of poor performance and/or the re-training may be done automatically by the speech recognition system.

One cause of poor recognition performance is voice template similarity. Similar voice templates make template matching difficult. Similar voice templates are common for words that sound similar (e.g., "five" and "nine"). It is especially troublesome for words of the same class (e.g., numbers), words that may be spoken together, and/or words that are equally expected at a dialog response points. Sometimes the similarity can be corrected by better enunciation or different pronunciation of the word/phrase.

The present invention embraces methods that prevent voice template similarity from resulting during training or re-training. These methods proactively prevent workers from completing training of an application vocabulary with voice templates for words that could otherwise confuse the speech recognition system.

Figure 2:
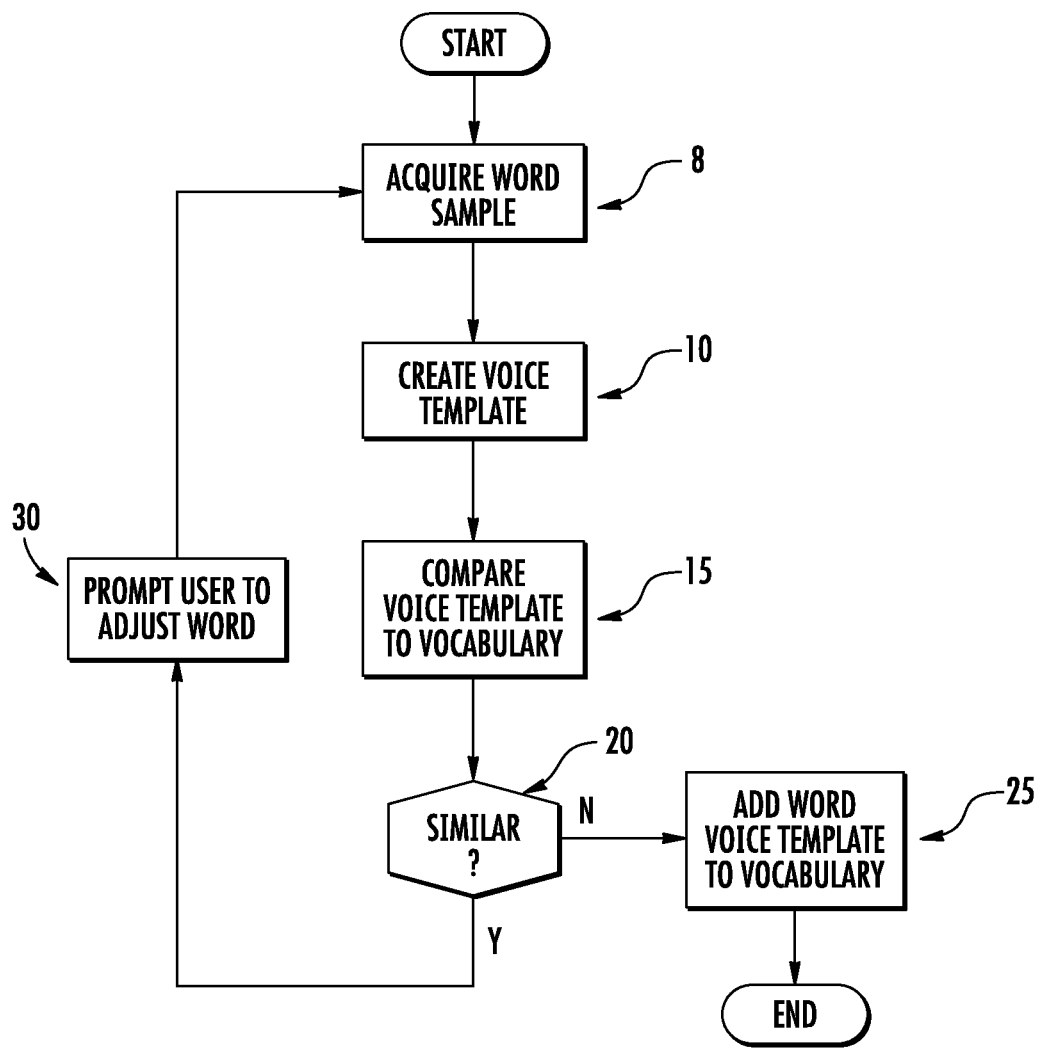
FIG. 2 is a flowchart illustrating a method for creating a voice template for a speech recognition system according to an embodiment of the present invention.

FIG. 2 illustrates a method for creating a voice template for a speech recognition system according to an embodiment of the present invention.

The method begins with the step of acquiring a speech sample 8. This speech sample is typically a spoken word but could also be a set of spoken words (i.e., phrase). The speech sample may be a word/phrase spoken once or may be a word/phrase spoken repeatedly. The word/phrase is part of an application vocabulary that includes voice templates for different words/phrases. The voice templates for word/phrases in the application vocabulary may be generic voice templates for all users or may be custom voice templates for a single user.

A voice template is created 10 for the spoken word from the speech sample. The voice template may be a file of data points representing the digital samples of the voice waveform created when the word is spoken into the microphone 4 and digitized by the computing device 7.

The voice template for the word is compared to voice templates from the application vocabulary 15. This comparison may yield a similarity score that may be used as the basis for determining if the voice template for the word is too similar to other words already in the application vocabulary. Various methods such as dynamic time warping (DTW) may be used to evaluate this similarity. For example, a similarity score may be created and compared to a threshold to determine if two words match.

The created voice template may be compared to the all words in the application vocabulary or a subset of words in the application vocabulary. For example, a subset of words may be words that sound alike or words from the same type (e.g., rhyming words) or class (e.g., numbers).

In speaker-dependent speech recognition systems, template similarity may be found if the created voice template matches the wrong word or the correct word and at least one other word's custom template. For speaker-independent speech recognition systems, template similarity may occur when the created voice template matches multiple generic voice templates or the wrong generic voice template. When similarity is found 20, then the user may be prompted to create a new template for the word in a way that is more likely to create a voice template for the word that is less similar to the other words in the application vocabulary. This prompt may be embodied as a voice message on a speaker and/or a text/graphical message on a display.

The method also includes the step of providing instructions (i.e., prompts) to a worker to help the worker create a less similar voice template for the word 30. These instructions may include a list of possible alternate words that could be used in place of the word. For example, the alternate word "fiver" might be suggested for use in place of the word "five." In another embodiment, the instructions provided could include prompts to help a worker enunciate the word more clearly or to emphasize the word differently (e.g., emphasize the "f" in "five"). In still another embodiment, a user may create their own word or sound to represent the word. This option may be especially useful for workers that have a native language that is different from the application dialog language. For example, a worker may choose to say "cinco" for the word "five."

The method continues when a user applies the instructions and creates a new template for the alternate word. Here, the method may repeat creating alternate voice templates until a suitable (i.e., no template similarity) is found. When a suitable alternate (i.e., substitute) word has been found, training for that word ends and the substitute word's voice template is stored in the application vocabulary 25. Form that point on, the substitute word represents the dialog word in the application vocabulary. For example the method may result in the voice template for "fiver" stored in the application library for the word "five". At this point, other words may be trained or the training of the speech recognition system may conclude.

Figure 3:
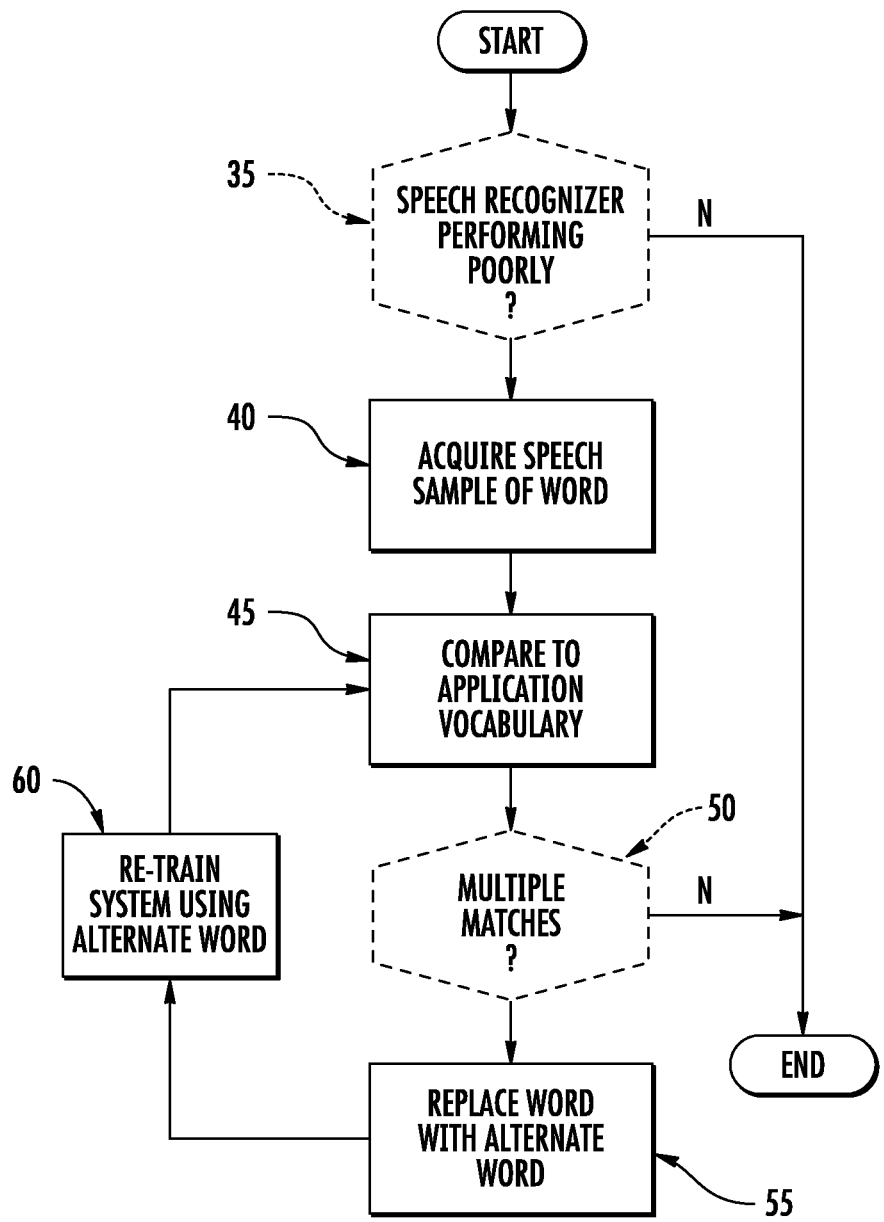
FIG. 3 is a flowchart illustrating a method for re-training a speech recognition system according to an embodiment of the present invention.

Sometimes re-training a speech recognition system on a word is required. A flowchart for a method for re-training a speech recognition system according to an embodiment of the present invention is shown in FIG. 3.

A speech recognition system may periodically evaluate its performance 35. If the speech recognizer is performing poorly (e.g., on a particular word) then the re-training may be initiated automatically. In some possible embodiments, the re-training may be initiated manually by a user. This initiation of re-training may be based on a user's evaluation or perception of the system's performance or may be for other reasons.

Re-training a speech recognition system begins with acquiring a speech sample (e.g., phrases that use the word) of a word 40. The speech sample is compared to voice templates for words (e.g., words that sound similar to the word) from an application vocabulary 45. If there the speech sample matches the wrong word or matches multiple words in the application vocabulary then the user is prompted (e.g., via graphic/text on a graphical user interface display) to retrain the system using an alternate word 55, 60. In one possible embodiment, the alternate word includes words chosen from a list of suggested words. In another possible embodiment the alternate word includes a set of words (i.e., phase) to represent the word. For example, the word "five" could be replaced with the word "number five."

In some embodiments, choosing alternate words 55, re-training 60, and comparing the alternate word to the application vocabulary 45 may continue until a suitably different voice template is created for the word. When a suitable alternate word is found, the voice template for this alternate word is inserted into the application vocabulary for the word and the re-training ends.

To supplement the present disclosure, this application incorporates entirely by reference the following commonly assigned patents, patent application publications, and patent applications:

U.S. Pat. Nos. 6,832,725, 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; D702,237;
8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,526;
8,798,367; 8,807,431;
8,807,432; 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;

U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.); U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for re-training a speech recognition system, the method comprising:
   acquiring, using the speech recognition system, multiple samples of a spoken word from a user, said spoken word representing a vocabulary word from an application vocabulary stored in a memory;
   creating, via at least one processor, a voice template for said spoken word from the multiple samples of said spoken word;
   comparing, via the at least one processor, the voice template for said spoken word to other voice templates for other words from the application vocabulary;
   if the voice template for said spoken word is similar to at least one of the other voice templates for the other words, then providing, via the at least one processor, information to the user, wherein the information comprises:
   (i) a prompt to create a new voice template for said spoken word, and
   (ii) instructions for adjusting said spoken word to make said new voice template for said spoken word less similar to the other voice templates for the other words, wherein the instructions for adjusting said spoken word comprise a prompt to help the user to enunciate said spoken word differently;
   acquiring, using the speech recognition system, multiple samples of an adjusted spoken word from the user;
   creating, via at least one processor, said new voice template for said adjusted spoken word from the multiple samples of said adjusted spoken word;
   comparing, via the at least one processor, said new voice template for said adjusted spoken word to other voice templates for other words from the application vocabulary; and
   if said new voice template for said adjusted spoken word is dissimilar to the other voice templates for the other words, then assigning said voice template for said adjusted spoken word to said spoken word in the application vocabulary stored in the memory;
   wherein, during the re-training, the comparison of the voice template for said spoken word to other voice templates for other words is performed until a unique voice template which is different from the other voice templates and having no template similarity with the other voice templates is created for the said spoken word;
   wherein the re-training is initiated after an initial enrollment training performed for the speech recognition system before use based on an outcome of a performance evaluation performed periodically by the speech recognition system; and
   wherein the performance evaluation is associated with recognition performance for the spoken word.

2. The method according to claim 1, wherein the instructions for adjusting said spoken word comprise prompts to help the user to enunciate said spoken word differently.

3. The method according to claim 1, wherein the instructions for adjusting said spoken word comprise prompting the user to utter an alternate word to represent said spoken word, wherein the alternate word is a variant of the word.

4. The method according to claim 3, wherein prompting the user to utter an alternate word comprises presenting the user with a set of possible alternate words.

5. The method according to claim 1, wherein the information provided to the user is displayed on a screen.

6. The method according to claim 1, wherein comparing the voice template for said spoken word to the other voice templates for other words from the application vocabulary comprises comparing the voice template for said spoken word to a subset of other words from the application vocabulary and wherein the subset of words corresponds to words from the application vocabulary which are at least of same type and of same class and wherein the comparing further comprises computing a similarity score and comparing the similarity score to a threshold.

7. The method according to claim 1, wherein the other voice templates for the other words comprise custom voice templates created for a specific user.

8. The method according to claim 1, wherein the other voice templates for the other words comprise generic voice templates created for any user.

9. A method for re-training a speaker-independent speech recognition system with respect to a word of an application vocabulary, wherein a generic voice template is assigned to said word in the application vocabulary, the method comprising:
   acquiring from a user a speech sample of said word using the speaker-independent speech recognition system;
   comparing, via at least one processor, the speech sample to generic voice templates in the application vocabulary; and
   if the speech sample matches more than one of the generic voice templates in the application vocabulary, then:
      prompting, via the at least one processor, the user to create a custom voice template for a substitute word,
      training, via the at least one processor, the speaker-independent speech recognition system on the substitute word to create the custom voice template for the substitute word, and
      replacing, via the at least one processor, in the application vocabulary the generic voice template for said word with the custom voice template for the substitute word; and
   otherwise, if the speech sample matches the generic voice template for said word, using, via the at least one processor, the generic voice template for the word;
   wherein, during the re-training, the comparison of the speech sample of said word to generic voice templates in the application vocabulary is performed until the custom voice template for the substitute word which is different from the generic voice templates and having no template similarity with the generic voice templates is created;
   wherein the re-training is initiated after an initial enrollment training performed for the speech recognition system before use based on an outcome of a performance evaluation performed periodically by the speech recognition system; and
   wherein the performance evaluation is associated with recognition performance for the word.

10. The method according to claim 9, wherein prompting the user to create a custom voice template for a substitute word comprises a list of possible substitute words.

11. The method according to claim 9, wherein the generic voice templates comprise voice templates for other words that sound similar to the word.

12. The method according to claim 9, wherein the generic voice templates comprise voice templates for a subset of other words of the application library which are at least one of the same type of words and the same class of words.

13. The method according to claim 9, wherein the substitute word comprises a different enunciation of the word.

14. The method according to claim 9, wherein the substitute word comprises a new word chosen by a user that is different from the word.

15. A method for re-training a speech recognition system with respect to a word of an application vocabulary, wherein a voice template is assigned to said word in the application vocabulary, the method comprising:
   acquiring from a user a speech sample of said word using the speech recognition system;
   comparing, via at least one processor, the speech sample to voice templates in the application vocabulary; and
   if the speech sample matches more than one of the voice templates in the application vocabulary, then:
      prompting, via the at least one processor, the user to re-train the speech recognition system using an alternate word in place of said word, wherein the alternate word is a variant of said word;
      training, via the at least one processor, the speech recognition system on the alternate word to create a voice template for the alternate word; and
      replacing, via the at least one processor, in the application vocabulary the voice template for said word with the voice template for the alternate word;
   wherein, during the re-training, the comparison of the speech sample of to the voice templates in the application vocabulary is performed until a voice template corresponding to the alternate word which is different from the voice templates of words in the application vocabulary and having no template similarity with the voice templates of words in the application library is created;
   wherein the re-training is initiated after an initial enrollment training performed for the speech recognition system before use based on an outcome of a performance evaluation performed periodically by the speech recognition system; and
   wherein the performance evaluation is associated with recognition performance for the spoken word.

16. The method according to claim 15, comprising, before acquiring the speech sample of said word, determining that the speech recognition system has poor performance.

17. The method according to claim 15, wherein the voice templates comprise voice templates for words that sound similar to the word.

18. The method according to claim 15, wherein the speech sample comprises utterances of phrases that use the word.

19. The method according to claim 15, wherein the alternate word comprises a word chosen from a list of suggested words.

20. The method according to claim 19, wherein the alternate word comprises a set of words.

* * * * *